3,748,294
LIQUID COMPOSITIONS COMPRISING GELLED URETHANE POLYMER
Robert William Kershaw, South Blackburn, and Livia Polgar, Caulfield, Victoria, Australia, assignors to Dulux Australia Ltd., Melbourne, Australia
No Drawing. Filed Aug. 2, 1971, Ser. No. 168,411
Int. Cl. C08g 22/08; C09d 3/72
U.S. Cl. 260—22 TN                                    12 Claims

ABSTRACT OF THE DISCLOSURE

A process is disclosed whereby liquid, self-stabilized gels of urethane polymer free of visible gel particles, in an inert organic liquid are prepared from polyisocyanate and polyhydroxy reactants which would otherwise co-react to form visible gels. The liquids are useful per se for the manufacture of surface coatings and blends thereof with conventional coatings compositions, especially of the air-drying alkyd resin type, enhance through-drying rates and retard wrinkling.

---

This invention relates to a process of preparing liquid compositions comprising gelled urethane polymer, to liquid compositions so-prepared and to coating compositions comprising such liquids.

It is well known that many products and industrial processess depend, for their effective utilization, on the availability of liquid compositions comprising polymeric materials. In general, there are substantive reasons why the polymer should have as high a molecular weight as is consistent with the provision of liquids of tractable viscosity at the required polymer content.

This invention is concerned, in particular, with that class of compositions which comprise urethane polymers, that is polymers in which urethane linkages are formed by the reaction of hydroxyl groups of a polyhydroxy compound with isocyanate groups of a polyisocyanate. In the liquid compositions which we now disclose urethane resins of very high molecular weight are obtained by cross-linking reactions and the nature of the reactants is such that if they were co-reacted by conventional polymerization processes a substantially insoluble, non-liquid mass would be formed; that is the liquid compositions comprise gelled urethane polymer.

The reaction of a polyhydroxy compound with a polyisocyanate to give, through the consequent formation of urethane linkages, a polymeric compound is well-known. It is also known that the reaction obeys the established theories of polymer formation and in particular, if the reactants possess sufficient numbers of functional groups, that is hydroxyl and isocyanate groups, mixtures of the two components in appropriate proportions will co-react to form cross-linked gelled polymer which is substantially insoluble in liquids normally used to dissolve such materials prior to gellation. Mixtures of a urethane polymer gel and such a liquid are typically non-free-flowing and are generally commercially undesirable products. They may, for example, form a jelly-like mass or a heterogeneous mixture in which fragments of gelled polymer are visible.

Surprisingly, we have now discovered that free-flowing liquid compositions essentially free of visible gel particles can be prepared by the controlled gellation of a co-reacting mixture of a polyisocyanate and a polyhydroxy precursor as hereunder defined when the reaction is carried out in an inert organic liquid in which the polyisocyanate and polyhydroxy precursor are essentially soluble. The reaction must be carried out at low concentrations, the reactants being well diluted by the inert organic liquid. By an inert organic liquid we mean a liquid which does not take part in or inhibit the reaction between isocyanate and hydroxyl groups. The liquid so-formed would appear to be a self-stabilized dispersion of gelled urethane polymer in the organic liquid. The liquids are typically transparent or slightly hazy but are essentially free of polymer particles visible under an optical microscope. The size of the disperse particles has been estimated by electron microscopy to lie within the range of about 50–1500 angstrom units. Liquid viscosities of from 0.5 to 50.0 poise at 40% weight disperse solids are achievable. No additional stabilizers are required to stabilize the liquids.

Accordingly, we now provide a process of preparing a liquid composition essentially free of visible polymer particles and comprising a self-stabilized dispersion of gelled urethane polymer in an organic liquid, wherein a polyisocyanate and a polyhydroxy precursor are mixed and co-reacted at a total concentration of said reactants not exceeding 30% by weight in an inert organic liquid in which the reactants are essentially soluble at the reaction temperature and further characterized in that (a) The polyisocyanate comprises on average at least 1.5 isocyanate groups per molecule, (b) The polyhydroxy precursor is a polyhydroxy compound comprising on average at least 1.5 hydroxyl groups per molecule and at least 30% by weight of pendant chains having a structural backbone of at least 10 covalently linked carbon atoms, the said chains being solvatable by the inert organic liquid but inert with respect to the urethane gel-forming reaction, (c) The polyisocyanate and polyhydroxy precursor in combination shall comprise at least 15% by weight of said pendant chains having a structural backbone of at least 10 covalently linked carbon atoms, and (d) The mixture of polyisocyanate and polyhydroxy precursor is selected to be a gellable composition which at a concentration of at least 50% by weight in the inert organic liquid reacts to form a visible polymeric gel.

In one preferred embodiment of the process the polyisocyanate and polyhydroxy precursor are added separately and concurrently to the stirred inert organic liquid, optionally heated to accelerate the reaction, and at such a rate that the unreacted components are well diluted by the inert organic liquid, the maximum permitted concentration of unreacted components in the process being 30% by weight.

The hydroxyl groups of the precursor and the isocyanate groups of the polyisocyanate co-react rapidly to form urethane linkages and a self-stabilized gel of urethane polymer.

Accordingly we further provide a free-flowing liquid composition comprising gelled urethane polymer stably self-dispersed in an organic liquid the composition being essentially free of visible gel particles and the urethane polymer comprising at least 15% by weight of pendant chains having structural backbone of at least 10 covalent carbon atoms which are solvated by the inert organic liquid.

When the organic liquid is suitably volatile the liquid compositions may be used to form a coating film on a substrate by evaporation of the liquid and self-association of the gel particles into a coherent film. Optionally the liquid compositions may be pigmented to provide opaque and/or coloured coating compositions.

We therefore further provide liquid coating compositions comprising gelled urethane polymer as hereinabove defined and optionally pigmented, stably self-dispersed in a volatile organic liquid the composition being essentially free of visible gel particles.

The basis of selection of a gellable mixture of a polyisocyanate and a polyhydroxy compound is well known in the art. For example, once a particular polyhydroxy compound has been selected for use, the nature and concentration of a suitable polyisocyanate to give a gellable reaction mixture can be determined by conventional means.

It is known from work of Carothers and others and discussed, for example, in "The Chemistry of Organic Film Formers" (Solomon, D. H., John Wiley & Sons) at page 80, that if the average functionality of the reactants in such a mixture exceeds 2 the composition will gel. Conversely, if the functionality of the reactants is known, the proportions of precursor and polyisocyanate which will give gellable compositions can be calculated. In practice we have found that mixtures of polyisocyanate and polyhydroxyl precursor which have an estimated average functionality of as low as 1.95 can provide gellable compositions, probably due, at least in part, to the uncertainties involved in estimating the actual composition of commercial materials when applying these calculations. We therefore adopt the following expedient in establishing the actual gelling proportions for a particular mixture of reactants.

The approximate theoretical combination of polyisocyanate and polyhydroxy precursor which should give a gellable composition is calculated by the above method. A series of mixings, including the theoretical combination but varying the relative proportions of the two constituents, is then prepared and caused to polymerize. For ease of manipulation we carry out this test at 50% solids by weight in the desired inert organic liquid. Gellable compositions are then determined by inspection of the polymer samples so-prepared by, for example, checking their solubilities in known solvents for non-gelled polymers of the same general composition. It is frequently obvious from a visual inspection of the end product that it has in fact gelled.

The polyisocyanate to be used in this process must comprise on average at least 1.5 isocyanate groups per molecule. That is it may be a compound and optionally a polymeric compound having attached thereto two or more reactable isocyanate groups. We also comprehend in our understanding of polyisocyanates, however, mixtures of compounds each of which bears at least one isocyanate group, provided the mixture as a whole meets our requirement of providing at least 1.5 isocyanate groups per molecule. This situation is met with, for example, when using commercial isocyanates, especially polymeric or so-called pre-condensate isocyanates, which frequently consist of a mixture of compounds bearing different numbers of isocyanate groups per molecule. In general we prefer to avoid the use of mixtures comprising a preponderance of mono-isocyanates, which do not directly contribute to the formation of gelled urethane resins.

The polyisocyanates may be either aliphatic or aromatic in nature or contain both aliphatic and aromatic segments. Suitable polyisocyanates used either alone or combination are, for example 2:4 tolylene diisocyanate, 2:6 tolylene diisocyanate, hexamethylene diisocyanate, p-phenylene diisocyanate, diphenyl methane-4:4 diisocyanate and condensates thereof comprising three or more isocyanate groups.

When the isocyanate is at least in part aliphatic it may provide pendant chains solvatable by the organic liquid of the composition and having a structural backbone of at least ten covalently linked carbon atoms. These chains which will then make a contribution to the required overall concentration of such components in the gelled urethane polymer; as described above.

The polyisocyanate may be introduced into the reaction mixture in the form of a compound providing blocked isocyanate groups, which at the appropriate unblocking temperature undergo the typical reaction of an isocyanate with a hydroxyl group. Blocking agents of this include; for example, phenols, thiols, tertiary alcohols, secondary aromatic amines and 1:3-dicarboxyl compounds.

In its simplest form the polyhydroxy precursor may consist of a relatively low molecular weight di-hydroxyl compound to which is attached a pendant solvatable chain of the required length and weight proportion. The nature of the pendant chain is determined primarily by the requirements that it shall have a structural backbone of at least 10 covalently linked carbon atoms, be inert with respect to the urethane gellation reaction and solvated by the organic liquid. By a pendant chain we mean a chain which is attached at one end only by a covalent bond to the residue of the precursor molecule.

That is the pendant chain is a chain-like segment of the precursor molecule. The degree to which a chain-like segment is solvated by an organic liquid depends on the polarity of the segment relative to that of the liquid. If the segment and the liquid are of similar polarity then in general the segment will be freely extended in the liquid; that is it is solvated by the liquid. If the segment was of dis-similar polarity to that of the liquid then the segment would be in a collapsed or coiled state in the presence of the liquid; that is it would be relatively non-solvated, if at all, by the liquid. The requirement that the pendant chain be solvated by the liquid is, therefore, met by a chain-like segment which is per se soluble in the liquid.

Bearing in mind that the inert organic liquid must be inert with respect to the urethane forming reaction, and hence will usually be relatively non-polar, i.e. in general it will be essentially a hydrocarbon liquid, these requirements of solubility and inertness will be met by pendant chains which are hydrocarbon chains. They may be saturated or unsaturated hydrocarbon chains; that is they may comprise one or more carbon-carbon double bonds.

Thus suitable saturated chains are, for example, saturated hydrocarbon chains derived from fatty acids, e.g. caproic, caprylic, capric, lauric, myristic, palmitic and stearic acids. The hydrocarbon chains may be unsaturated, e.g. chains derived from oleic, linoleic, linolenic, licanic and eleostearic acids. Such chains may be used singly or in combination in the polyhydroxy precursor.

The chains need not, however, be entirely hydrocarbon and may include a hetero-atom, for example an oxygen atom, provided the substituent so-formed on the chain is not reactive with either the isocyanate or hydroxyl groups used in preparing the gelled urethane polymers under the selected reaction conditions. We have found, for example, that the secondary hydroxyl group of 12-hydroxy stearic acid can be sufficiently inert under normal reaction conditions for chains derived therefrom to be used in our compositions.

Thus suitable polyhydroxyl precursors are provided by polyhydroxy esters of the above acids with polyols, for example glycerol, polyglycerol, trimethylol ethane, trimethylol propane, pentaerythritol and dipentaerythritol. The polyhydroxy precursors need not, however, be produced from a single acid and esters of mixtures of the above acids may be used. For example, the esters may be mixtures of the above acids as they occur naturally in, e.g. the commercial products known as coconut, cottonseed, linseed, olive, safflower, soya, sunflower tung and tall oil fatty acids. The acids may be introduced into the polyhydroxyl compound by direct esterification or, for example, by trans-esterification of their triglyceride or methyl esters. The polyhydroxyl precursors so-produced will usually be equilibrium mixtures whose composition can, however, be determined analytically, rather than pure compounds.

The polyhydroxy precursor may also be polymeric. For example it may be an ester of an epoxy resin and an acid of the above described type. Suitable epoxy resins which may be used in this way are, for example, the condensation products of epichlorhydrin with bisphenol-A.

Another useful type of polymeric polyhydroxy precursor is a polyester condensation resin which is the reaction product of a polybasic acid and a polyhydric alcohol. That is it may be an alkyd resin which contains unreacted hydroxyl groups. Resins of this type are well-known and may comprise polyhydric alcohols of the above type condensed with polybasic acids, for example o-phthalic, iso-phthalic, maleic and succinic acids or the appropriate acid anhydrides. A particular advantage of polyhydroxy precursors of this type is that the required pendant chains can be readily introduced into them during manufacture by the use in known manner, of fatty acid triglyceride oils or the corresponding fatty acids. When such resns are used in coating compositions as film-forming polymers it is usual to prepare them at relatively high average molecular weight, typically of the order of 4000-5000. For the purpose of the present process it is not necessary, however, that these polymers be condensed to such high molecular weights before reacting them with isocyanates.

When polymeric products of the above types are used in our process we have found that although average values can be assigned to their hydroxyl contents, this is a tedious job and because of the inherent errors arising from the complexity of their composition, for example molecular weight, hydroxyl group and pendant chain distribution, it is usually preferable to determine gellable mixtures in combination with the chosen polyisocyanate by the practical test described above.

The nature of the inert organic liquid is related to the choice of polyisocyanate and polyhydroxy precursor, both of which must be essentially soluble in the liquid. Bearing in mind that the liquid must not react with hydroxyl or isocyanate groups at the reaction temperature and that the polyhydroxy precursor must comprise at least 30% by weight of solvatable pendant chains the selected liquid will usually be substantially hydrocarbon in nature. Suitable inert organic liquids are, for example, pentane, heptane, hexane, octane, toluene, xylene and other alkyl benzenes. The liquid may be a mixture of such materials and especially one of the commercial mixtures of such hydrocarbons, e.g. white spirits, mineral turpentine and the solvent naphthas. A minor proportion of other liquids, for example ketones or esters may be used, for example to increase the solubility of one or other of the reactants in the inert organic liquid. The liquid may, in fact, be a lower alkyl esters, for example n-butyl acetate.

The inert organic liquid need not, however, be a volatile compound. For example it may be an oil, e.g. a drying oil such as linseed, soya, safflower and tobacco seed oil. This can have a useful practical advantage in that a composition prepared therefrom by the process of this invention will be substantially nonvolatile. When a film of such a composition is allowed to dry in air, the drying oil autoxidises and there is relatively little shrinkage of the film during drying compared with films deposited from solutions of polymers in volatile organic liquids.

Alternatively, the inert organic liquid may be a solution of a suitably inert polymer in a volatile organic liquid.

Broadly stated, an inert organic liquid in which all of the reactants are soluble at the reaction temperature is a satisfactory liquid for use in our process. This does not exclude, however, the use of a liquid in which a reactant is essentially but not necessarily completely soluble. By essentially soluble we mean that there may be a trace, e.g. of the order of 1-2% by weight of reactant, which does not dissolve in the liquid, which consequently has a cloudy appearance. For example a satisfactory polyhydroxy precursor may be an equilibrium reaction product of a polyhydric alcohol with a fatty acid in which a minor proportion of unreacted polyol is present. A product such as this has been observed to produce a slightly turbid mixture with an aromatic hydrocarbon liquid but will give a satisfactory composition comprising a gelled urethane polymer when reacted according to the invention. The cloudiness usually disappears as the reaction proceeds and theoretical predictions of gellable mixtures commonly show good agreement with practice; taking the suspended unreacted polyol into account in the calculations as reactable material.

When inert organic liquids having these characteristics are chosen, the particles of gelled urethane polymer which form during the process are insoluble in the liquid because of their cross-linked gelled nature and a substantial proportion of them are detectable as disperse particles of the order of 50–1500 A. by examination with an electron microscope. The reactants are not necessarily completely converted to insoluble gel and a minor proportion of soluble polymer species may be detectable in solution in the liquid. It is a particular feature of our process, however, that if the same reactants are reacted in the absence of the organic liquid or in the presence of say 50% by weight or less of the liquid they would form visible gels or even a solid gelled mass which could not be subsequently dispersed in the liquid to form a free-flowing visually homogeneous, stable liquid.

The process may be carried out by adding the polyisocyanate to the inert organic liquid to which not more than 30% by weight of the polyhydroxyl precursor has been added and allowed to react with constant stirring. Optionally the mixture may be heated to increase the rate of reaction. Provided the polyhydroxy precursor and polyisocyanate do not co-react when cold, they may be pre-mixed and then added to the inert organic liquid, reaction then being initiated by heating, for example to unblock blocked isocyanate groups, which are then free to react with hydroxyl groups. We have observed that for the best results the reaction should take place rapidly. Conventional catalysts for the isocyanate-hydroxyl reaction may be used; for example N-methyl morpholine, stannous chloride, tertiary n-butyl tin, di-n-butyl tin laurate and dimethyl tin dichloride.

In one preferred embodiment of the process, the polyisocyanate and polyhydroxy precursor are added separately and concurrently to the stirred organic liquid, which optionally is heated and may contain a catalyst for the urethane reaction, at such a rate that the unreacted components are well diluted by the inert organic liquid. At no time must the concentrations of unreacted components exceed 30% by weight of the liquid. The preferred rate of addition is dependent on the particular reactants chosen and is hence best selected by practical trial. We have found, for example, that if some mixtures of reactants are added too rapidly to the liquid, a visible, non-redispersible gel may form. However, by carrying out the addition of reactants at a slower rate, the same composition of materials can be made to yield a visually homogeneous liquid composition. It is, in fact, a broad general characteristic of our process that although we have found 30% by weight concentration of unreacted components to be the useful upper limit, for the best results in terms of uniformity of product and ease of process control it is sometimes desirable to work at lower concentrations, e.g. 20–25%. The preferred working concentration of reactants depends on the actual formulation used and is best determined by actual experiment.

Once the liquid composition is formed, the total solids can be increased, typically to the order of up to 50–60% by weight, without loss of stability of the dispersion.

Liquid compositions prepared according to this invention can be used as film-forming polymers in surface coatings, for which purpose they may optionally be pigmented by dispersing in them by conventional means known pigments, for example to provide opacity and or colour to the dry films. Provided the inert organic liquid is suitably volatile, coatings of such compositions on a substrate dry rapidly in air to a tack-free condition; that is they can exhibit what is commonly referred to in the art as a lacquer-type dry.

When the gelled urethane polymer of the invention comprises pendent solvated chains which are polyunsaturated fatty acid chains, e.g. the residues of drying oil fatty acids, the films formed therefrom may be autoxidizable in air. It then becomes possible to provide coating films which initially have the advantage of rapidly reaching a tack-free state on drying in air with an inherent insolubility in many organic liquids due to their gelled structure, but are additionally autoxidizable to further increase their hardness and insolubility. Furthermore, because the polymer is itself a high molecular weight gel, the amount of autoxidation necessary to give a hardness and flexibility equivalent to, for example, an air-drying alkyd resin is much lower. Consequently, in comparison with the alkyd resin, the polymer we now provide can have a much lower content of autoxidizable fatty acid residue in combination with an unusually high content of non-autoxidizable (e.g. mono-unsaturated) fatty acid residues but still have a comparable drying time as a film on a substrate. We associate this difference in composition with improvements in colour retention, flexibility and durability over the otherwise comparable alkyd resin.

Another advantage of the use of these high molecular weight gelled polymers when used in surface coating compositions is that when, for example, the polyhydroxyl precursor is a polyester resin, this can comprise as units of its polymer backbone an unusually high proportion of flexible units, for example adipic acid residues, to provide flexible films without the sacrifice of very rapid tack-free drying times.

Because the polyhydroxy precursor may itself be polymeric and of relatively high molecular weight, a proportionately small quantity of polyisocyanate is sufficient to convert it to a gelled urethane polymer. For example less than 10% by weight of a low molecular weight diisocyanate may be sufficient to provide, by the process we disclose, a liquid composition comprising a very high molecular weight gelled urethane polymer. By way of contrast, it has been stated that in conventional urethane polymers proposed for use as solutions in suitable solvents for the preparation of surface coatings compositions, no advantage is to be gained by the formation of urethane linkages unless the polymer contains more than 15% by weight of polyisocyanate. (Sempert, R. E., Official Digest, 36, 475, 1964.) As the polyisocyanate is usually expensive and frequently imparts undesirable yellowing characteristics to polymers in which it is incorporated, the compositions herein disclosed have an inherent advantage over these conventional materials in their low requirement of polyisocyanate.

The liquid compositions we provide are very good dispersing media for the pigments used in paint compositions.

For some applications however, we find it is preferable to blend with the liquids comprising gelled urethane polymer a proportion of a conventional paint vehicle, e.g. a solution of an alkyd resin in a volatile liquid, to provide the most useful tought, flexible films. By selection a suitable balance can be struck between the desirable properties of the conventional vehicle, which is usually much slower drying to the tack-free state, and the very rapid dry of the compositions we now disclose.

For example ws made a comparison of the drying rate of linseed oil and a 50% drying oil modified alkyd resin with the same materials blended with a gelled urethane polymer prepared by the above-described method. The resins were applied as thin films to plate glass and allowed to dry in air at 47° F. with the results shown in the following table. The components in each test sample are given on a solids basis as percent parts by weight.

|  | 1 | 2 | 3 | 4 |
|---|---|---|---|---|
| Alkyd resin | 100 | 64 | | |
| Gelled urethane polymer | | 36 | | 60 |
| Linseed oil | | | 100 | 40 |
| Tack-free film | ¹ 2½ | ² 10 | (³) | ² 17 |
| Insolubility in xylene achieved | ¹ 2½ | ¹ 1½ | | ¹ 1½ |

¹ Hours.
² Minutes.
³ Film wet at 3 hours.

These results show clearly beneficial results obtainable by blending a liquid prepared according to our process with a conventional typical paint film-forming polymer.

A particularly useful application of the compositions of this invention is in their admixture with conventional oil modified alkyd resin to control the wrinkling and through-dry of air-drying enamels. The rate of drying of conventional enamels involves a compromise between a satisfactorily rapid through-dry and a tendency for the film to skin-dry and wrinkle if the drying is accelerated too much. However, substitution of the alkyd resin by say 20–30% by weight (based on the polymer solids content) of a urethane resin composition according to this invention has been shown to simultaneously upgrade both the through-drying rate and the resistance of the enamel to wrinkling.

We have surprisingly found that these liquids comprising gelled urethane polymer can also be blended to a homogeneous, stable liquid with known water-dispersible resins. When these are pigmented and applied to surfaces by brushing they form fast-drying, coherent paint films. The brushes can also be cleaned satisfactorily with water after use, despite the presence of the gelled urethane polymer in the paint.

The invention is illustrated by the following examples in which all parts are given by weight:

EXAMPLES 1–6

Liquids of 50% by weight solids content and comprising gelled urethane polymer are prepared from fatty acid ester polyhydroxy precursors and a polyisocyanate.

In each of these examples a polyhydroxy precursor was first prepared and then reacted with a commercial tolylene diisocyanate (T.D.I.) by the following general methods. Each of the mixtures of precursor and polyisocyanate when caused to co-react as 50% solutions in xylene formed insoluble gels, which could not be re-incorporated in the xylene to provide mobile liquids free of visible gel particles: That is they were gellable compositions.

Precursor preparation

A mixture of soya oil fatty acids and polyhydric alcohol in the proportions given was heated under reflux with 1% by weight (based on the fatty acids content) of a lead naphthenate solution in xylene containing 12% by weight of lead and sufficient additional xylene to maintain a steady reflux at 200–220° C. Water was continuously removed from the reflux condensate and the reaction continued until the partial ester so-formed had an acid value of less than 2 mgm. KOH per gm. The product was a polyhydroxy precursor.

Gelled urethane polymer preparation

The polyhydroxy precursor was diluted to 20% by weight solids with xylene, mixed with the required weight of polyisocyanate as a 20% by weight solution in xylene and stirred continuously for one hour, to give a liquid comprising a gelled urethane polymer. The batch was then concentrated by distillation to a solids content of 40% by weight. Subsequent testing was carried out on the 40% solids solution as typifying a conventional composition for a surface coating vehicle.

Testing

A film of the liquid under test, (catalyzed with 1.0% by weight of a cobalt naphthenate solution at 3% by weight cobalt content) was applied by applicator blade to a plate glass panel at a wet film thickness of 150 micron and allowed to dry in air at 25° C. and 50% relative humidity. The tack-free time of the film was determined by finger touch and the xylene insolubility checked by spotting the film at regular time intervals with xylene. The point of insolubility was taken to be the time when the spotted area of film ceased to liquify under the action of the xylene and although it may have wrinkled, a coherent continuous film remained over the test area.

The proportions of reactants used in the examples and the test results are given in the following table:

The examples were repeated with similar results, replacing the soya fatty acids by an equal weight of safflower fatty acids. The 40% solids composition of the examples were pale amber, slightly hazy liquids and ranged in viscosity from 0.2 to 1.4 poise.

droxy precursors and tolylene diisocyanate to inert organic liquids.

A series of polyhydroxy precursors was prepared by the condensation at 200–220° C. of mixtures of soya oil fatty acids, polyols and dibasic acids according to the following table. Reaction water was removed azeotropically using xylene as the entraining liquid. The condensation was continued in each preparation until an acid value of less than 5 mgm. KOH per gm. was reached. A catalytic

| Ex. No. | Polyol | Molar ratios | | | Average function-ality | Tack-free, minutes | Xylene insoluble, minutes |
|---|---|---|---|---|---|---|---|
| | | F. acid | Polyol | T.D.I. | | | |
| 1 | Di-pentaerythritol | 2.60 | 1 | 1.70 | 2.26 | 5 | 4 |
| 2 | Pentaerythritol | 1.50 | 1 | 1.25 | 2.13 | 4 | 4 |
| 3 | Sorbitol | 3.00 | 1 | 1.50 | 2.18 | 13 | 10 |
| 4 | Glycerol | 0.75 | 1 | 1.13 | 2.09 | 7 | 9 |
| 5 | Tri-pentaerythritol | 4.00 | 1 | 2.00 | 2.29 | 8 | 5 |
| 6 | Trimethylolethane | 0.75 | 1 | 1.13 | 2.09 | 6 | 5 |

EXAMPLES 7–14

Liquids of 50% by weight solids content and comprising gelled urethane polymer are prepared from various fatty acids esters of pentaerythritol, providing polyhydroxyl precursors, and tolylene diisocyanate.

The general preparative and testing method of Examples 1–6 was repeated but using the reactants and with the results given in the following table. Testing was again carried out on samples concentrated by distillation to 40% solids by weight.

In Example 15 it was established that the secondary hydroxyl groups of the 12-hydroxy stearic acid were not detectably involved in the reaction with the isocyanate groups of the T.D.I. and they were disregarded in calculating the average functionality of the mixture.

The mixture of components used in Example 13 was not a gellable mixture according to our test and the long tack-free time will be observed. All other compositions were made from gellable mixtures. The 40% solids compositions were clear to slightly hazy amber liquids with viscosities ranging from 0.2 to 0.5 poise.

quantity of lead naphthenate as in Examples 1–6 was used to accelerate the esterification. Polyester type polyhydroxy precursors were produced by this process.

Each precursor was then diluted to 40% solids by weight with xylene and added concurrently with the addition of the shown quantity of commercial tolylene diisocyanate (as a 10% solution by weight in xylene) to about 30% of the total batch weight of xylene in a stirred reaction vessel. The additions were made at a uniform rate over a period of 2 hours, during which time the contents of the reaction vessel were maintained at a temperature of 140° C. Before testing, the liquids were concentrated by distillation to 40% by weight solids.

The liquids so-produced were then tested by the method of Example 1. It will be noted that Example 20 had an abnormally long tack-free and xylene insolubility time by comparison with the other examples. In contrast to the other examples, the polyhydroxy precursor and polyisocyanate combination of this example did not form a gellable

| Ex. No. | Fatty acids | Molar ratios | | | Average function-ality | Tack free, minutes | Xylene insoluble, minutes |
|---|---|---|---|---|---|---|---|
| | | F. acid | Polyol | T. D. I. | | | |
| 7 | Soya | 1.50 | 1 | 1.25 | 2.13 | 12 | 56 |
| 8 | Tall | 1.50 | 1 | 1.25 | 2.13 | 16 | 70 |
| 9 | Linseed/tung (8:1) | 1.23 | 1 | 0.95 | 1.97 | 12 | 17 |
| 10 | Linseed | 1.30 | 1 | 1.35 | 2.19 | 20 | 35 |
| 11 | Soya/coconut (1:1) | 1.30 | 1 | 1.00 | 2.00 | 16 | 86 |
| 12 | Soya | 2.00 | 1 | 1.00 | 2.00 | 24 | 57 |
| 13 | do | 2.20 | 1 | 0.90 | 1.95 | >120 | 84 |
| 14 | 12-hydroxy stearic | 3.00 | 1 | 1.50 | 2.18 | 13 | |

EXAMPLES 15–20

Preparation of liquids comprising gelled urethane polymer by the concurrent and separate addition of polyhydroxy precursors and tolylene diisocyanate to inert organic liquids.

mixture by our above-described test and was thus not a composition of the type we now disclose.

The 40% solids compositions were clear to slightly hazy amber liquids with viscosities of from 0.2 to 1.4 poise.

| Ex. No. | Polyol (molar ratios) | Polyacid | Molar ratios | | | | Average function-ality | Tack-free, minutes | Xylene insoluble, minutes |
|---|---|---|---|---|---|---|---|---|---|
| | | | F. acid | Polyol | Poly acid | T. D. I. | | | |
| 15 | Pentaerythritol | Phthalic anhydride | 1.50 | 1 | 0.63 | 0.63 | 2.13 | 7 | 27 |
| 16 | do | Adipic acid | 1.00 | 1 | 0.60 | 0.90 | 2.29 | 4 | 56 |
| 17 | P. E./ethyleneglycol (1.67:1) | Phthalic anhydride | 0.63 | 1 | 0.75 | 0.56 | 2.22 | 5 | 48 |
| 18 | P. E./trimethylol propane (1.67:1) | Adipic acid | 0.63 | 1 | 0.75 | 0.75 | 2.32 | 9 | 31 |
| 19 | P. E./ethylene glycol (1.67:1) | Phthalic anhydride | 0.63 | 1 | 0.75 | 0.28 | 2.02 | 11 | 46 |
| 20 | do | do | 0.63 | 1 | 0.75 | 0.11 | 1.89 | >120 | >120 |

EXAMPLE 21

Preparation of a liquid comprising a gelled urethane polymer from a polyhydroxy precursor and a trifunctional polyisocyanate.

A polyhydroxy precursor was prepared by the partial esterification of pentaerythritol with soya oil fatty acids (molar ratios 1:1.5) and then reacted with a 0.83 molar proportion of a tri-isocyanate by the general method of Examples 16–21 to form a liquid comprising a gelled urethane polymer and free of visible gel particles. The tri-isocyanate used was an aliphatic condensation product of three moles of hexamethylene diisocyanate. The combination of precursor and polyisocyanate had an average functionality of 2.40 and formed a gellable mixture by our above-mentioned test. Before testing, the liquid comprising gelled urethane polymer was concentrated to 30% by weight solids. This product was a clear, straw-coloured liquid with a viscosity of 20 poise.

When tested by the method of Example 1 the film of the liquid had a tack-free time of 15 minutes and was xylene-resistant in 30 minutes.

When attempts were made to repeat the above preparation of liquid comprising gelled urethane polymer but using a more concentrated feed of reactants and feed rates such that the concentration of reactants in the batch exceeded 30% by weight, a heterogeneous, semi-liquid gel was formed. The estimated maximum concentration of reactants reached was of the order of 40% by weight.

EXAMPLE 22

Preparation of a free-flowing liquid comprising a gelled urethane polymer stably self-dispersed in mineral turpentine.

A mixture of:

| | Parts |
|---|---|
| Linseed oil fatty acids | 729 |
| Pentaerythritol | 324 |
| Tung oil | 290 |
| Xylene | 160 |
| Phthalic anhydride | 166 | was heated to 210° C. under reflux in a stirred reaction vessel fitted with a water separator and held to an acid value of 0.6 mgm. KOH per gm., at which point 67 parts of water had been removed in the water separator. The batch was then thinned with 500 parts of mineral turpentine, to provide a solution of a polyhydroxy precursor.

A similar reaction vessel was charged with 33 parts of mineral turpentine, which was heated to 130° C. The following two solutions were then added separately but concurrently at a uniform rate over a period of 3 hours to the batch:

| | Parts |
|---|---|
| Solution 1: | |
| Polyhydroxy precursor solution (above) | 38.50 |
| Lead naphthenate solution (12% Pb) | 0.16 |
| Solution 2: | |
| Commercial tolylene diisocyanate | 4.64 |
| Mineral turpentine | 3.50 |

When the above additions were completed the batch was held at 130° C. for a further 1 hour and then 0.2 part of n-butanol added to it, to provide a free-flowing liquid comprising gelled urethane polymer. This liquid was clear and free of visible gel particles, had a total solids content of 39.9% by weight and a viscosity of 1.6 poise. When examined with an electron microscope, extremely fine particles of disperse polymer not visible using an optical microscope, were detected.

EXAMPLE 23

The effect on wrinkling characteristics of adding a liquid composition according to the invention to a conventional alkyd resin enamel is demonstrated.

An air-drying alkyd resin enamel was prepared in a conventional manner by pigmenting a 50% solids by weight solution in mineral turpentine of a 50% linseed/tung oil (35:15) modified glycerol phthalate alkyd resin to 15% pigment volume concentration with titanium dioxide. The enamel was thinned to brushing viscosity with mineral turpentine to provide a "control" enamel.

In the same manner, a series of enamels was prepared in which the alkyd resin solution was progressively replaced (on a solids basis) by a liquid composition comprising gelled urethane resin according to Example 22.

Films of each enamel were applied by a 5.2-mil applicator blade to glass panels and allowed to dry in air. All enamels air-dried to hard, glossy films. The degree of wrinkling was rated visually by an arbitrary scale of from 0–5, where 0 signifies no wrinkling and 5 severe wrinkling. The results were as follows:

| | Enamel number | | | | | |
|---|---|---|---|---|---|---|
| | 1 | 2 | 3 | 4 | 5 | 6 |
| Urethane solids, parts | 50 | 40 | 30 | 20 | 10 | |
| Alkyd solids, parts | 50 | 60 | 70 | 80 | 90 | 100 |
| Wrinkling | 0 | 0 | 0 | 1 | 2 | 4 |

It can be seen that an addition of 20–30% of liquid comprising gelled urethane polymer (on solids) eliminated wrinkling from the enamel.

EXAMPLE 24

Preparation of a liquid composition according to the invention in which the inert organic liquid is in part linseed oil.

An alkyd resin containing unreacted hydroxyl groups was prepared from the following mixture:

| | Parts |
|---|---|
| Soya oil fatty acids | 53.3 |
| Pentaerythritol | 19.7 |
| Phthalic anhydride | 17.1 |
| Itaconic acid | 4.6 |
| Zinc oxide | 0.1 |
| Oxalic acid | 0.2 |
| Xylene | 5.0 |

The above ingredients were heated in a stirred reactor fitted with a water extractor to 205° C. and held at that temperature until the acid value of the solid resin so-formed fell to 13.7 mgm. KOH per gm. Water of reaction was continuously stripped off and reflux maintained by further additions of xylene as required. The batch was then cooled and thinned to 61.6% solids by weight of mineral turpentine to provide a solution of a polyhydroxy precursor.

To 30.1 parts of the above solution were added 22.0 parts of linseed oil and 1.35 parts of a commercial grade of tolylene diisocyanate. This mixture in turn was added slowly at a uniform rate over a period of 3 hours to a mixture of 46.3 parts of linseed oil and 0.2 part of lead naphthenate heated to 135° C. in a stirred reaction vessel. The temperature was maintained for a further 1½ hours to form a free-flowing liquid comprising gelled urethane polymer.

Cobalt naphthenate drier was added to the above product (0.2% cobalt calculated on the total solids content) and a sample of linseed oil was treated in the same manner.

Each sample was then applied as a film to glass plates using a 5-mil applicator and allowed to dry in air at ambient temperature.

The linseed oil film was tack-free in 6 hours. After 1 day it was observed to be highly wrinkled and to have a thick surface skin, under which the film remained tacky.

By way of contrast, the film prepared from liquid comprising gelled urethane polymer dispersed in linseed oil was tack-free in 4 hours and after 1 day it was found to be hard dry throughout with no sign of wrinkling.

EXAMPLE 25

Use of a liquid comprising gelled urethane polymer in an aqueous system.

An aqueous dispersion of a polyether modified linseed oil, total solids 57% by weight and Gardner-Holdt viscosity H, was blended with a solution of gelled urethane polymer solution according to Example 15 in the proportion of 30:70 by weight on solids content. An addition of cobalt naphthenate (0.2% Co on resin solids content) was then made to the mixture.

A 5-mil film of the above mixture was applied to a glass plate with an applicator blade and allowed to dry in air. The tack-free drying time was 20 minutes, the dry film being clear and homogeneous.

The mixture was removed easily from the applicator blade with water.

We claim:

1. A process of preparing a liquid composition essentially free of visible polymer particles and comprising a self-stabilized dispersion of gelled urethane polymer particles having a particle size of 50 to 1500 angstrom units in an organic liquid wherein a polyisocyanate and a polyhydroxy precursor are mixed and co-reacted at a total concentration of said reactants not exceeding 30% by weight in an inert organic liquid in which the reactants are essentially soluble at the reaction temperature and further characterized in that
   (a) the polyisocyanate comprises on average at least 1.5 isocyanate groups per molecule,
   (b) the polyhydroxy precursor is a polyhydroxy compound comprising on average at least 1.5 hydroxyl groups per molecule and at least 30% by weight of pendant chains attached at one end only to the residue of the precursor molecule said chains having a structural backbone of at least 10 covalently linked carbon atoms, and the said chain being solvatable by the inert organic liquid but inert with respect to the urethane gel-forming reaction,
   (c) the polyisocyanate and polyhydroxy precursor in combination shall comprise at least 15% by weight of said pendant chains having a structural backbone of at least 10 covalently linked carbon atoms, and
   (d) the mixture of polyisocyanate and polyhydroxy precursor is selected to be a gellable composition which at a concentration of at least 50% by weight in the inert organic liquid reacts to form a visible polymeric gel.

2. A process according to claim 1 in which the pendant chains are hydrocarbon chains derived from fatty acids.

3. A process according to claim 1 in which the polyhydroxy precursor is a polyhydroxy ester of a fatty acid and a polyol.

4. A process according to claim 1 in which the polyhydroxy precursor is an ester of a fatty acid and an epoxy resin.

5. A process according to claim 1 in which the polyhydroxy precursor is an alkyd resin containing unreacted hydroxyl groups.

6. A process according to claim 1 in which the inert organic liquid is at least in part a natural drying oil.

7. A process according to claim 1 in which the polyisocyanate and polyhydroxy precursor are added separately and concurrently to the stirred inert organic liquid at such a rate that the unreacted components are well diluted by the inert organic liquid, the maximum permitted concentration of unreacted components in the process being 30% by weight.

8. A process according to claim 7 in which the organic liquid to which the polyisocyanate and polyhydroxy precursor are added is heated to accelerate the coreaction.

9. A liquid composition essentially free of visible polymer particles and comprising a self-stabilized dispersion of gelled urethane polymer particles having a particle size of 50 to 1500 angstrom units in an inert organic liquid and further characterized in that the gelled urethane polymer comprises at least 15% by weight of pendant chains attached at one end only to the residue of the urethane polymer and having a structural backbone of at least 10 covalently linked carbon atoms, the said pendant components being solvated by the inert organic liquid.

10. A liquid composition according to claim 9 in which the inert organic liquid is at least in part a drying oil selected from the group consisting of linseed, soya, safflower and tobacco seed oils.

11. A coating composition comprising a blend of a liquid composition according to claim 9 with a solution of an alkyd resin in a volatile liquid.

12. A liquid composition according to claim 9 in which the composition is pigmented to provide an opaque or coloured coating composition.

References Cited

UNITED STATES PATENTS

| | | | |
|---|---|---|---|
| 3,542,709 | 11/1970 | Kazama et al. | 260—22 TN |
| 3,553,121 | 1/1971 | Argarbright et al. | 260—22 TN |
| 3,573,248 | 3/1971 | Pedain et al. | 260—33.6 UB |
| 3,458,260 | 7/1969 | Owens et al. | 260—18 TN |
| 3,506,617 | 4/1970 | Collardeau et al. | 260—77.5 SP |

FOREIGN PATENTS

| | | | |
|---|---|---|---|
| 749,456 | 12/1966 | Canada | 260—77.5 SP |
| 957,585 | 5/1964 | Great Britain | 260—18 TN |

M. J. WELSH, Primary Examiner

R. W. GRIFFIN, Assistant Examiner

U.S. Cl. X.R.

117—124 E, 161 KP; 260—18 PT, 18 TN, 33.6 UB, 77.5 SP